(12) United States Patent
Parcon et al.

(10) Patent No.: US 12,465,738 B2
(45) Date of Patent: Nov. 11, 2025

(54) TATTOO MACHINE WITH MAGNETIC AND FRICTION POWER SOURCE CONNECTOR

(71) Applicant: Bishop Tattoo Supply, Inc., Orange, CA (US)

(72) Inventors: Jadeanne Parcon, Corona, CA (US); Rodney Aguiar, Orange, CA (US); Franco Vescovi, Orange, CA (US)

(73) Assignee: Bishop Tattoo Supply, Inc., Orange, CA (US)

( * ) Notice: Subject to any disclaimer, the term of this patent is extended or adjusted under 35 U.S.C. 154(b) by 395 days.

(21) Appl. No.: 18/304,751

(22) Filed: Apr. 21, 2023

(65) Prior Publication Data

US 2024/0165383 A1    May 23, 2024

Related U.S. Application Data

(60) Provisional application No. 63/384,661, filed on Nov. 22, 2022.

(51) Int. Cl.
  *A61M 37/00*    (2006.01)
(52) U.S. Cl.
  CPC .............................. *A61M 37/0076* (2013.01)
(58) Field of Classification Search
  CPC .......... A61M 37/00; A61M 2037/0007; A61M 37/0015; A61M 37/0076; A61M 2205/10; A61M 2205/8206; H02J 7/00; H02J 7/0042; H02J 2310/23; H01R 13/6205; H01R 13/625; H01R 31/06; H01M 50/50; H01M 50/503
  See application file for complete search history.

(56) References Cited

U.S. PATENT DOCUMENTS

| | | | |
|---|---|---|---|
| 10,471,246 B1 * | 11/2019 | Lipscomb | ................ H02J 7/00 |
| 11,406,807 B2 | 8/2022 | Smead et al. | |
| 11,471,658 B1 | 10/2022 | Smead et al. | |
| 11,559,675 B1 | 1/2023 | Smead et al. | |
| 11,559,775 B2 | 1/2023 | Zahirovic et al. | |
| 11,857,749 B2 | 1/2024 | Siciliano et al. | |
| 2020/0306519 A1 * | 10/2020 | Smead | ................. H02J 7/0063 |
| 2022/0257918 A1 * | 8/2022 | Siciliano | ........... A61M 37/0076 |

* cited by examiner

*Primary Examiner* — Robert J Scruggs
(74) *Attorney, Agent, or Firm* — Kevin Schraven; Anooj Patel; Hankin Patent Law, APC

(57) ABSTRACT

A tattoo machine and wireless battery power supply comprising: a tattoo machine that comprises a body, a motor, and a power supply connection end, and a wireless battery power supply that comprises a battery and a tattoo machine connection end. The tattoo machine connection end comprises a depressed cavity at the bottom of which are power supply surface connectors and a magnetic material portion. The power supply connection end comprises a backplate protrusion, which may comprise one or more O-ring grooves, one or more O-rings, power supply pin connectors, and a magnet. The tattoo machine connection end and the power supply connection end are configured to matingly and electronically engage one another, such that the backplate protrusion is substantially within said depressed cavity, the O-rings frictionally contact an interior surface of the depressed cavity, the magnet and magnetic material portion are magnetically coupled.

20 Claims, 8 Drawing Sheets

TATTOO MACHINE WITH MAGNETIC AND FRICTION POWER SOURCE CONNECTOR

CROSS-REFERENCE TO RELATED APPLICATIONS

This Non-Provisional Patent application claims the benefit and takes priority from U.S. Utility Provisional Patent Application No. 63/384,661, which was filed on Nov. 22, 2022, the contents of which are incorporated herein by this reference as though set forth in their entirety, and to which priority is claimed.

FIELD OF DISCLOSURE

The present disclosure relates to tattoo machines. More specifically, the present disclosure relates to tattoo machines with interchangeable parts centering around the interconnectivity of a magnetic backplate. The magnetic backplate allows for a convenient tug or pop-off motion when connecting and disconnecting the power source from a tattoo machine.

BACKGROUND

Tattoo machines are an artistic tool used by tattoo artists to permanently apply inks and pigments to the out layers of skin of their customers. The primary hand-held elements of most tattoo machines includes a grip, a needle or cartridge, a machine body containing a motor to move the needle, and a power source. Tattoo machines can be powered wirelessly by batteries or via a wired power cord.

Some tattoo machines have removeable and replaceable power sources. With respect to power cords, these may include a bayonet twist-and-lock connection, a RCA power connection, or a 3.5 mm jack connection. Other tattoo machines may have removeable, rechargeable, and replaceable batteries. These methods of connecting a tattoo machine to a power source can be bulky, cumbersome, heavy, unstylish, or unattractive.

Some electronic devices make use of magnetic power connectors. An example of this is Apple's mag-safe cable connector for some of its devices. While these types of power connectors allow for simple and efficient engagement and disengagement of a device from a power source, these often accidentally pop out because there is nothing reinforcing the connector's attachment to the device.

Another example of an electronic device that makes use of a magnetic connector is the compact battery and voltage supply controller apparatus for a tattoo machine that is disclosed in U.S. Pat. No. 11,406,807 ("the '807 patent"). Importantly, the '807 patent discloses that the battery is contained removeably within a housing and that the battery does directly connect to the tattoo machine. Instead, the '807 patent specifically discloses that an adapter must be used to connect the battery to the tattoo machine. It is this adapter that is disclosed being magnetically coupled to the battery. The tattoo machine itself is not in any way disclosed in the '807 patent as being connected directly to the battery via a magnetic connector.

Therefore, a need exists for a tattoo machine with a magnetic backplate that can be used to connect directly to a power source, such as a battery, where the connection is robust, secure, and still easily removeable by means of a convenient pull or pop-off motion when connecting and disconnecting the power source from the tattoo machine.

SUMMARY

The following presents a simplified overview of the example embodiments in order to provide a basic understanding of some embodiments of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented hereinbelow. It is to be understood that both the following general description and the following detailed description are exemplary and explanatory only and are not restrictive.

One embodiment of the present disclosure may be a tattoo machine comprising a grip, a body, and a power source. The body may comprise a top end and a bottom end. The body may further comprise a motor housing, a motor, a backplate, and a male threaded core. The motor may be affixed within the motor housing. The backplate may be attached to the top end of the body, and the male threaded core may be attached to the bottom end of the body. The male threaded core may be hollow to allow a tattoo needle to move within the male threaded core. The backplate may further comprise at least one embedded magnet, at least one O-ring, at least one positive power spring pin connector, and at least one negative power spring pin connector. The at least one O-ring may be attached to the backplate along the perimeter of the backplate. The grip may comprise an inner face and an outer face, and the inner face of the grip may further comprise a female threaded core, where the female threaded core of the inner face of the grip may be configured to be removably screwed onto the male threaded core on the bottom end of the body.

The power source may further comprise a top end and a bottom end, where the bottom end of the power source may further comprise at least one positive power connector interface surface, at least one negative power connector interface surface, and at least one steel segment. The bottom end of the power source is shaped to matingly engage to the backplate of the body. The tattoo machine may receive power from the power source when the at least one positive power connector interface surface and the at least one negative power connector interface surface of the power source are in contact with the at least one positive power spring pin connector and the at least one negative power spring pin connector of the backplate of the body. The power source may be secured to the body when the at least one embedded magnet of the backplate is in contact with the at least one steel segment of the power source.

In another embodiment, the power source may be a replaceable battery unit. In other embodiments, the embedded magnet of the backplate may be a correlated polymagnet designed for optimal strength between the body and the power source. The backplate may be cylindrical in shape. The least one positive power spring pin connector and at least one negative power spring pin connector may be placed towards the center of the backplate.

In other embodiments, intentional strength may be required to remove the steel segment of the power source from the embedded magnet of the body. The grip may be interchangeable and replaceable. The bottom end of the power source and the backplate of the body may be configured to fully rotate about each other.

Another embodiment of the present disclosure may be tattoo machine comprising a grip, a body, and a power source. The body may comprise a top end and a bottom end, and may further comprise a motor housing, a motor, a cylindrical connector, and a male threaded core. The motor may be affixed within the motor housing, and the cylindrical connector may be attached to the top end of the body. The male threaded core may be attached to the bottom end of the body, where the male threaded core may be hollow to allow a tattoo needle to move within the male threaded core. The cylindrical connector may further comprise an embedded magnetic ring, at least one O-ring, a positive power spring pin connector, and a negative power spring pin connector. The at least one O-ring may be attached to the cylindrical connector along the perimeter of the cylindrical connector. The grip may comprise an inner face and an outer face, where the inner face of the grip may further comprise a female threaded core, and where the female threaded core of the inner face of the grip may be configured to be removably screwed onto the male threaded core on the bottom end of the body.

The power source may further comprise a top end and a bottom end, where the bottom end of the power source may further comprise a positive power ring surface, a negative power ring surface, and a steel ring. The bottom end of the power source may be shaped to matingly engage to the cylindrical connector of the body. The tattoo machine may receive power from the power source when the positive power ring surface and the negative power ring surface of the power source are in contact with the positive power spring pin connector and the negative power spring pin connector of the cylindrical connector of the body. The power source may be secured to the body when the embedded magnetic ring of the cylindrical connector is in contact with the steel ring of the power source.

In another embodiment, the power source may be a replaceable battery unit. In other embodiments, the embedded magnetic ring of the cylindrical connector may be a correlated polymagnet designed for optimal strength between the body and the power source. The least one positive power spring pin connector and at least one negative power spring pin connector may be placed towards the center of the cylindrical connector.

In other embodiments, intentional strength may be required to remove the steel ring of the power source from the embedded magnetic ring of the body. The grip may be interchangeable and replaceable. The bottom end of the power source and the cylindrical connector of the body may be configured to fully rotate about each other.

Another embodiment of the present disclosure may be a tattoo machine comprising a grip, a body, and a power source, The body may comprise a top end and a bottom end, where the body may further comprise a motor housing, a motor, a cylindrical connector, and a male threaded core. The motor may be affixed within the motor housing, the cylindrical connector may be attached to the top end of the body, and the male threaded core may be attached to the bottom end of the body. The male threaded core may be hollow to allow a tattoo needle to move within the male threaded core. The cylindrical connector may further comprise an embedded magnetic ring, at least one 0-ring, a positive power spring pin connector, and a negative power spring pin connector. The embedded magnetic ring may be a correlated poly-magnet designed for optimal strength between the body and the power source. The positive power spring pin connector and negative power spring pin connector may be placed towards the center of the cylindrical connector. At least one O-ring may be attached to the cylindrical connector along the perimeter of the cylindrical connector. The grip may comprise an inner face and an outer face, where the inner face of the grip may further comprise a female threaded core, where the female threaded core of the inner face of the grip may be configured to be removably screwed onto the male threaded core on the bottom end of the body. The grip may be interchangeable and replaceable.

The power source may be a replaceable battery unit. The power source may further comprise a top end and a bottom end, where the bottom end of the power source may further comprise a positive power ring surface, a negative power ring surface, and a steel ring. The bottom end of the power source may be shaped to matingly engage to the cylindrical connector of the body. The tattoo machine may receive power from the power source when the positive power ring surface and the negative power ring surface of the power source are in contact with the positive power spring pin connector and the negative power spring pin connector of the cylindrical connector of the body. The power source may be secured to the body when the embedded magnetic ring of the cylindrical connector is in contact with the steel ring of the power source. Intentional strength may be required to remove the steel ring of the power source from the embedded magnetic ring of the body. The bottom end of the power source and the cylindrical connector of the body are configured to fully rotate about each other.

In other embodiments, the overall connection mechanism between the cylindrical connector and the power source is an annular snap-fit mechanism that is secured by the magnetic force between the embedded magnetic ring of the cylindrical connector and the steel ring of the power source.

One embodiment may be a tattoo machine and wireless battery power supply comprising: a tattoo machine; and a wireless battery power supply; wherein the tattoo machine comprises a body, a motor, and a power supply connection end; wherein the wireless battery power supply comprises a battery and a tattoo machine connection end; wherein the tattoo machine connection end and the power supply connection end may be configured to matingly and electronically engage one another; wherein the tattoo machine connection end comprises a depressed cavity at the bottom of which may be a power supply positive connector, a power supply negative connector, and a magnetic material portion; wherein the power supply connection end comprises a backplate protrusion; wherein the backplate protrusion comprises one or more O-ring grooves, one or more O-rings, a tattoo machine positive connector, a tattoo machine negative connector, and a magnet; wherein when the tattoo machine connection end and the power supply connection end may be matingly and electronically engaged with on another: (i) the backplate protrusion may be substantially within the depressed cavity; (ii) the one or more O-rings frictionally contact an interior surface of the depressed cavity; (iii) the magnet and the magnetic material portion may be magnetically coupled; (iv) the power supply negative connector may be engaged with the tattoo machine negative connector; (v) the power supply positive connector may be engaged with the tattoo machine positive connector; and (vi) the tattoo machine connection end and the power supply connection end may be purposefully pulled apart by overcoming friction of the one or more O-rings and by overcoming magnetic coupling of the magnet and the magnetic material portion. The battery may be rechargeable. The magnet may be a correlated polymagnet. The backplate protrusion and the depressed cavity may be both substantially cylindrical in shape. The tattoo machine positive connector may be a positive power spring pin connector and the tattoo machine negative connector may be a negative power spring pin connector. The power supply positive connector may be a positive power connector interface surface and the power supply negative connector may be a negative power connector interface surface. The tattoo machine further comprises a removable grip. There may be two O-ring grooves and two O-rings.

Another embodiment may be a tattoo machine and wireless battery power supply comprising: a tattoo machine; and a wireless battery power supply; wherein the tattoo machine comprises a body, a motor, and a power supply connection end; wherein the wireless battery power supply comprises a battery and a tattoo machine connection end; wherein the tattoo machine connection end and the power supply connection end may be configured to matingly and electronically engage one another; wherein the tattoo machine connection end comprises a protrusion at the top of which may be a power supply positive connector, a power supply negative connector, and a magnetic material portion; wherein the protrusion further comprises one or more O-ring grooves and one or more O-rings; wherein the power supply connection end comprises a backplate depressed cavity; wherein the backplate depressed cavity comprises a tattoo machine positive connector, a tattoo machine negative connector, and a magnet; wherein when the tattoo machine connection end and the power supply connection end may be matingly and electronically engaged with on another: (i) the protrusion may be substantially within the backplate depressed cavity; (ii) the one or more O-rings frictionally contact an interior surface of the backplate depressed cavity; (iii) the magnet and the magnetic material portion may be magnetically coupled; (iv) the power supply negative connector may be engaged with the tattoo machine negative connector; (v) the power supply positive connector may be engaged with the tattoo machine positive connector; and (vi) the tattoo machine connection end and the power supply connection end may be purposefully pulled apart by overcoming friction of the one or more O-rings and by overcoming magnetic coupling of the magnet and the magnetic material portion. The battery may be rechargeable. The magnet may be a correlated polymagnet. The protrusion and the backplate depressed cavity may be both substantially cylindrical in shape. The tattoo machine positive connector may be a positive power spring pin connector and the tattoo machine negative connector may be a negative power spring pin connector. The power supply positive connector may be a positive power connector interface surface and the power supply negative connector may be a negative power connector interface surface. The tattoo machine further comprises a removable grip. There may be two O-ring grooves and two O-rings.

Another embodiment may be a tattoo machine and wireless battery power supply comprising: a tattoo machine; and a wireless battery power supply; wherein the tattoo machine comprises a body, a motor, a removeable grip, and a power supply connection end; wherein the wireless battery power supply comprises a rechargeable battery and a tattoo machine connection end; wherein the tattoo machine connection end and the power supply connection end may be configured to matingly and electronically engage one another; wherein the tattoo machine connection end comprises a depressed cavity at the bottom of which may be a power supply positive connector, a power supply negative connector, and a magnetic material portion; wherein the power supply connection end comprises a backplate protrusion; wherein the backplate protrusion comprises one or more O-ring grooves, one or more O-rings, a tattoo machine positive connector, a tattoo machine negative connector, and a correlated polymagnet; wherein the backplate protrusion and the depressed cavity may be both substantially cylindrical in shape; wherein when the tattoo machine connection end and the power supply connection end may be matingly and electronically engaged with on another: (i) the backplate protrusion may be substantially within the depressed cavity; (ii) the one or more O-rings frictionally contact an interior surface of the depressed cavity; (iii) the correlated polymagnet and the magnetic material portion may be magnetically coupled; (iv) the power supply negative connector may be engaged with the tattoo machine negative connector; (v) the power supply positive connector may be engaged with the tattoo machine positive connector; and (vi) the tattoo machine connection end and the power supply connection end may be purposefully pulled apart by overcoming friction of the one or more O-rings and by overcoming magnetic coupling of the magnet and the magnetic material portion. The tattoo machine positive connector may be a positive power spring pin connector and the tattoo machine negative connector may be a negative power spring pin connector. The power supply positive connector may be a positive power connector interface surface and the power supply negative connector may be a negative power connector interface surface. There may be two O-ring grooves and two O-rings.

Still other advantages, embodiments, and features of the subject disclosure will become readily apparent to those of ordinary skill in the art from the following description wherein there is shown and described a preferred embodiment of the present disclosure, simply by way of illustration of one of the best modes best suited to carry out the subject disclosure As it will be realized, the present disclosure is capable of other different embodiments and its several details are capable of modifications in various obvious embodiments all without departing from, or limiting, the scope herein. Accordingly, the drawings and descriptions will be regarded as illustrative in nature and not as restrictive.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION

Figure 1:
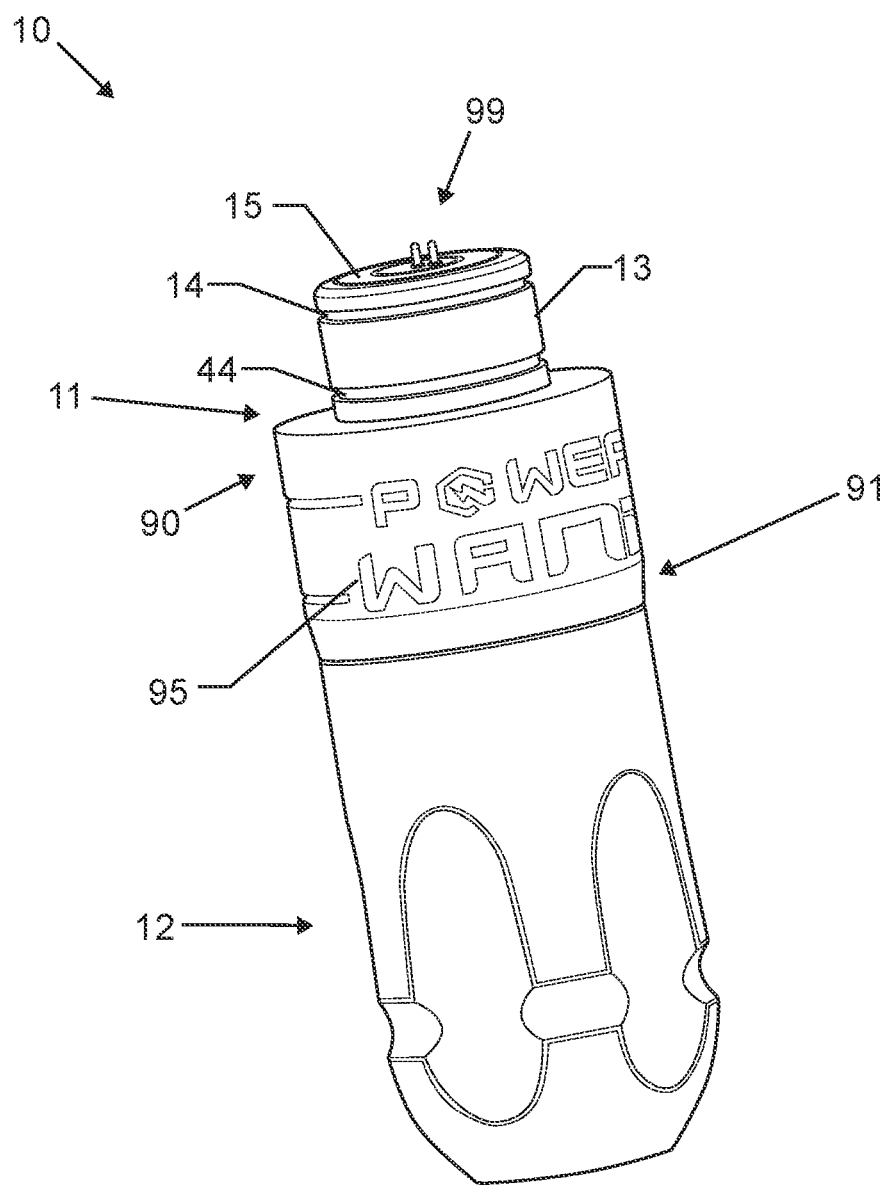
FIG. 1 is an illustration of one embodiment of a tattoo machine with an exposed backplate, which is not connected to a power source.

In the following detailed description of various embodiments, numerous specific details are set forth in order to provide a thorough understanding of various aspects of the embodiments. However, these embodiments may be practiced without some or all of these specific details. In other instances, well-known methods, procedures, and/or components have not been described in detail so as not to unnecessarily obscure aspects of the embodiments.

While multiple embodiments are disclosed, still others will become apparent to those skilled in the art from the following detailed description. As will be realized, these embodiments are capable of modifications in various obvious aspects, all without departing from the spirit and scope of protection. Accordingly, the graphs, figures, and the detailed descriptions thereof, are to be regarded as illustrative in nature and not restrictive. Also, the reference or non-reference to a particular embodiment shall not be interpreted to limit the scope of protection.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and/or "about" generally refer to a deviance of within 5% of the indicated number or range of numbers. In one embodiment, the term "approximately" and "about," may refer to a deviance of between 0.0001-40% from the indicated number or range of numbers.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all embodiments of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the examples included therein and to the Figures and their previous and following description.

Various embodiments are now described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form to facilitate describing these embodiments. It is to be understood that the methods and systems are not limited to specific methods, specific components, or to particular implementations. It is also to be understood that the terminology used herein is for the purpose of describing particular embodiments only and is not intended to be limiting.

Embodiments of the present disclosure generally relates to tattoo machines with interchangeable parts centering around the interconnectivity of a magnetic backplate. The magnetic backplate allows for a convenient "pop-off" motion when connecting and disconnecting the power source from a tattoo machine.

FIG. 1 is an illustration of one embodiment of a tattoo machine with an exposed backplate, which is not connected to a power source. FIG. 1 shows the tattoo machine 10 with no power source attached, exposing the backplate protrusion 13. As shown in FIG. 1, tattoo machine 10 may comprise a grip 12 and a body 11, which may have a backplate protrusion 13 that may be configured to matingly, but removeably, engage with a power source. The body 11 may comprise a housing 95, a power source connection end 90, which may comprise the backplate protrusion 13, and a grip connection end 91. The housing 95 preferably contains a motor, a cam that translates the rotational motion of the motor into a linear back and forth motion of the tattoo needle or cartridge. Preferably, the grip 12 may be threadably engaged with the housing 95, so that different grips may be connected to the body 11. The backplate protrusion 13 may comprise at least one embedded magnet 15, one or more O-ring grooves 14, 44, and a power source connector, which may comprise at least one positive power spring pin connector, and at least one negative power spring pin connector.

The O-ring grooves 14, 44 may be parallel to each other and placed along the perimeter of the vertical surface of the backplate protrusion 13. Preferably, the O-ring grooves 14, 44 are configured to matingly engage with a rubber, silicone, or plastic O-ring, such that the O-rings remain substantially in place in the O-ring grooves 14, 44 when the tattoo machine 10 is disconnected from the power source.

The grip 12 may comprise an inner face and an outer face, and the inner face of the grip may further comprise a female threaded core, where the female threaded core of the inner face of the grip 12 may be configured to be removably screwed onto the male threaded core on the grip connection end 91 of the housing 95.

The backplate protrusion 13 may be shaped and configured to matingly engage with the power source (not shown), which is kept firmly in place via the embedded magnet 15 and the O-rings (not shown).

In other embodiments, the embedded magnet 15 of the backplate protrusion 13 may be a correlated polymagnet designed for optimal strength between the body 11 and the power source. Intentional strength may preferably be required to disconnect the magnetic material (such as iron or steel) contained within the power source from the embedded magnet 15 when they are coupled together. The power source and the backplate protrusion 13 may be configured to connect at any rotation and still be operatively and electrically connected to each other.

In other embodiments, embedded magnet 15 may be any type of magnet, including, but not limited to, rare earth magnets, permanent magnets, neodymium, alnico, ceramic, ferrite, temporary magnets, and/or electromagnets.

In another embodiment, the backplate protrusion 13 can instead be a cylindrical connector with an embedded magnetic ring or a cavity with a magnet. In other embodiments, the connection between the backplate protrusion 13 or cylindrical connector and the power source may be an annular snap-fit mechanism that is secured by the magnetic force between the embedded magnet 15 or embedded magnetic ring of the cylindrical connector and the steel segment or steel ring of the power source.

The embodiment shown in FIG. 1 illustrates the backplate protrusion 13 as a projection or protrusion coming from the center of the power source connection end 90 of the body 11. The backplate protrusion 13 in this embodiment is configured to fit snugly inside a depressed cavity on the tattoo connection end of a power source. In other embodiments, the backplate (not shown) may instead be a depressed cavity at the power source connection end of the body, and the connection end of the power source may comprise a central projection that fits snugly inside the depressed cavity of the body 11.

Figure 2:
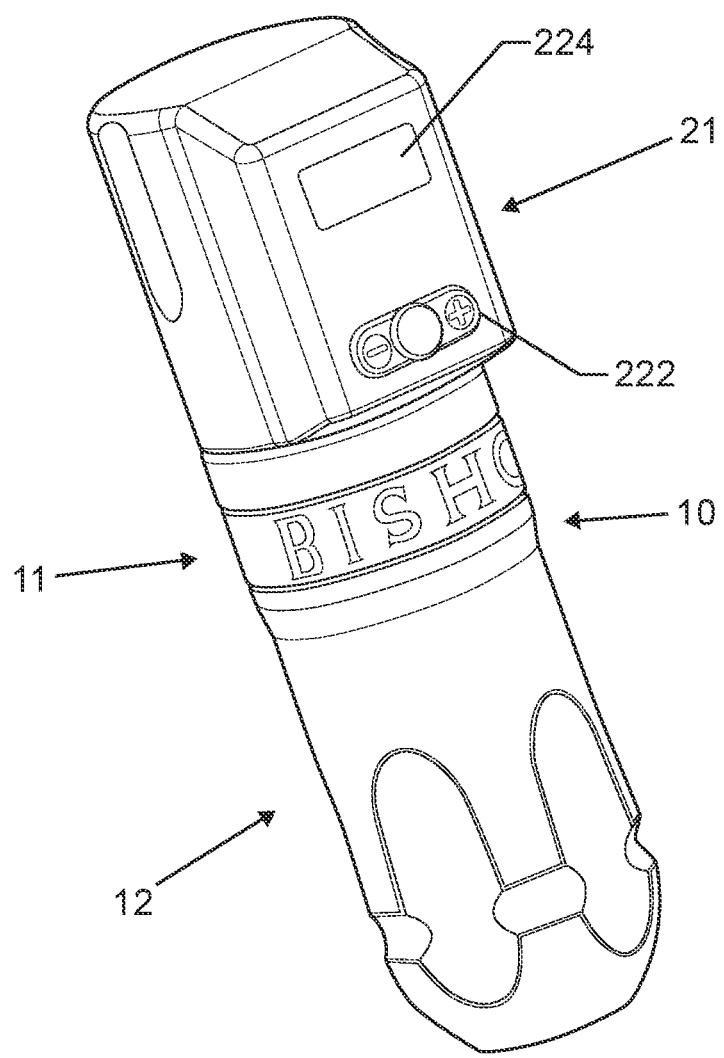
FIG. 2 is an illustration of one embodiment of the tattoo machine that is connected to one embodiment of a removeable and replaceable wireless power source.

FIG. 2 is an illustration of one embodiment of the tattoo machine that is connected to one embodiment of a removeable and replaceable wireless power source. As shown in FIG. 2, the tattoo machine 10 may be matingly, but removeably connected to a removeable and replaceable wireless battery power source 21. Preferably, the diameters of the wireless battery power source 21 and the body 11 are substantially identical at the point of connection to provide a sleek profile and to make gripping and holding the tattoo machine 10 with attached wireless battery power source 21 easy and comfortable to hold.

The wireless battery power source 21 may comprise at least one positive power connector interface surface (not shown), at least one negative power connector interface surface (not shown), and at least one magnetic material segment (not shown). The wireless battery power source 21 may be shaped to matingly engage to the backplate of the body 11. The tattoo machine 10 may receive power from the wireless battery power source 21 when the at least one positive power connector interface surface and the at least one negative power connector interface surface of the wireless battery power source 21 are in contact with the at least one positive power spring pin connector and the at least one negative power spring pin connector of the backplate of the body 11. The wireless battery power source 21 may be secured to the body 11 when the at least one embedded magnet of the backplate is in contact with the at least one magnetic material segment of the power source, which is typically steel, but can be any magnetic material.

In other embodiments, the bottom end of the wireless battery power source 21 may instead comprise a positive power ring surface instead of a positive power connector interface surface, a negative power ring surface instead of a negative power connector interface surface, and a steel ring in place of a steel segment. The connection end of the wireless battery power source 21 may be shaped to matingly engage to the cylindrical connector of the body 11.

In some embodiments, the wireless battery power source 21 is rechargeable. Recharging the wireless battery power source 21 can be done through a charging port on the wireless battery power source 21 or through the interface surfaces.

FIG. 2 also shows that the wireless battery power source 21 may preferably have a display screen 224 and controller 222. The controller 222 may be used to turn on and off the tattoo machine 10 and to control the speed/power. The display screen 224 may be used to display information relevant to the wireless battery power source 21 to the user, such as battery life, on/off status, and current power level.

Figure 3:
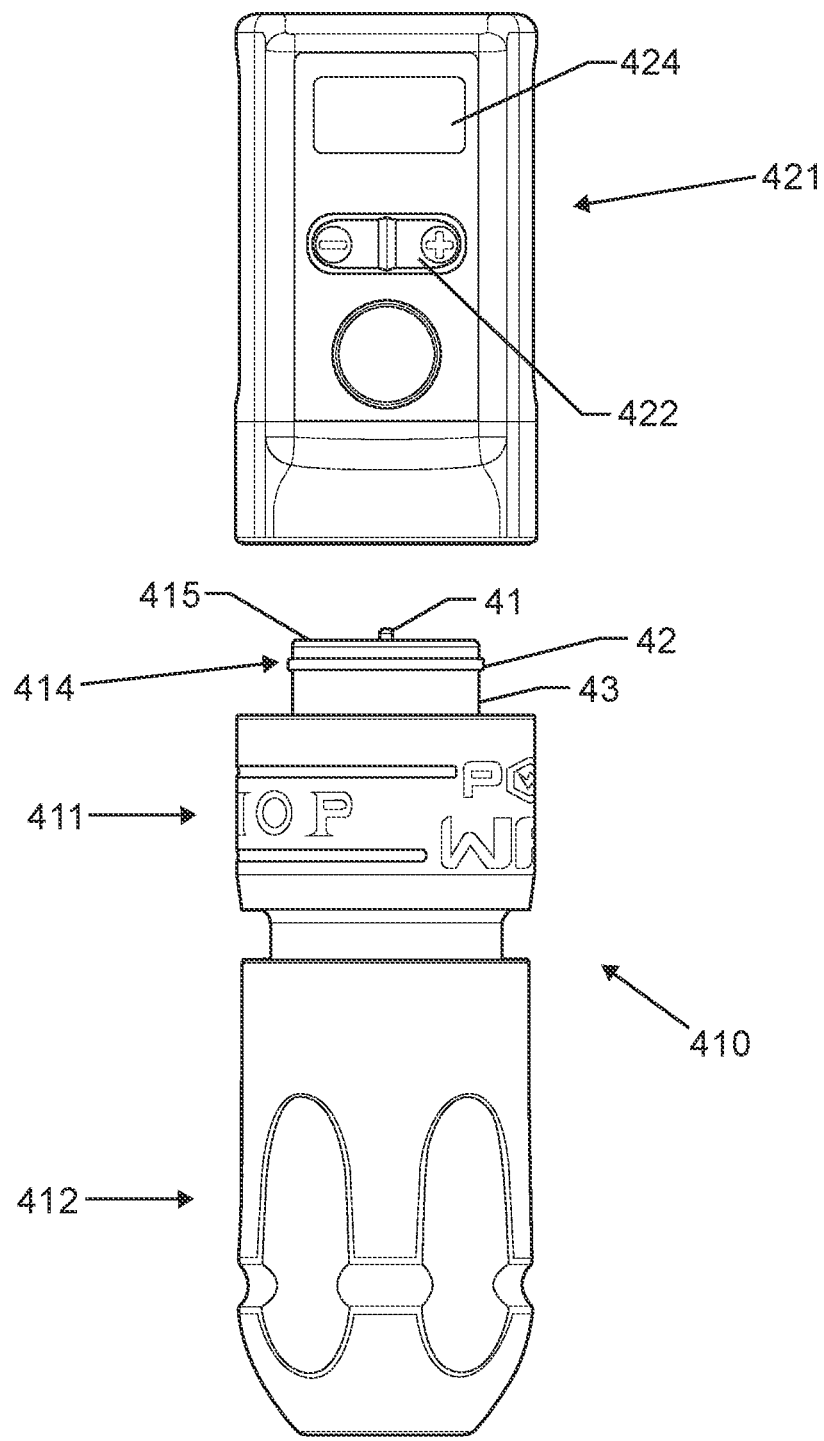
FIG. 3 is an illustration of an exploded view of one embodiment of a tattoo machine and one embodiment of a disconnected wireless power source.
Figure 4:
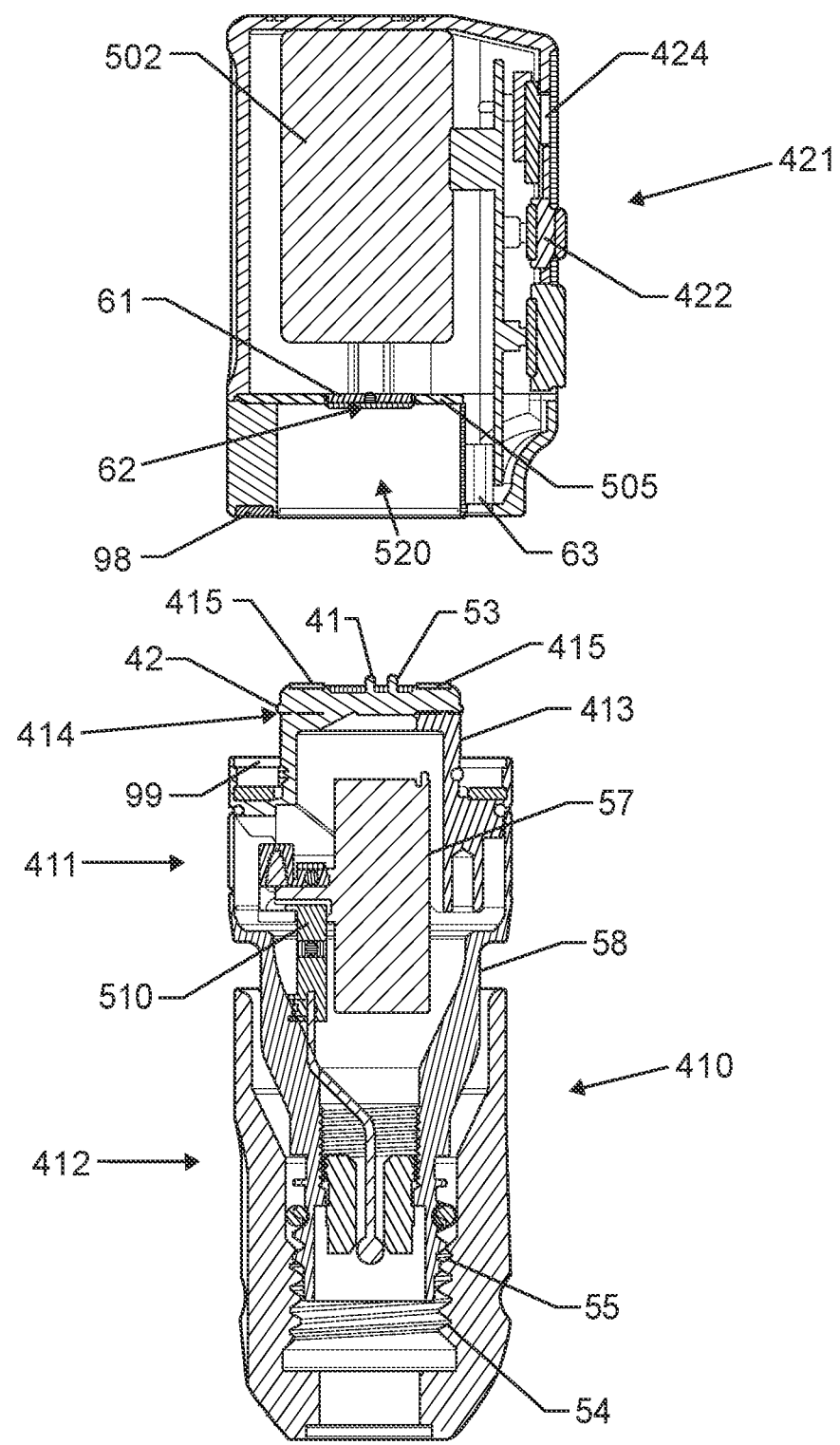
FIG. 4 is an illustration of an exploded and cross-section view of one embodiment of a tattoo machine and one embodiment of a disconnected wireless power source.

FIG. 3 is an illustration of an exploded view of one embodiment of a tattoo machine and one embodiment of a disconnected wireless power source. As shown in FIG. 3, the tattoo machine 410 may be just recently disconnected from, or about to be connected with, a removeable and replaceable wireless battery power source 421. As shown in FIG. 4, when the wireless battery power source 421 is removed from the tattoo machine 410, the backplate protrusion 413 is visible. Preferably, the backplate protrusion 413 may comprise magnet 415, O-ring groove 414, O-ring 42, and positive spring pin connector 41. The positive spring pin connector 41, which is typically one of two electrical contacts, may directly transmit power from the wireless battery power source 421 to the tattoo machine 410 by making contact with the at least one positive power connector interface surface and/or the at least one negative power connector interface surface of the wireless battery power source 421. The O-ring 42 may provide additional friction between the tattoo machine 410 and the wireless battery power source 421, such that the connection between the two parts is firm and steady. Although only one O-ring 42 and O-ring groove 414 are shown, two or even more grooves and O-rings may be present. The O-ring 42 provides a tight friction based fit between the wireless battery power source 421 and the tattoo machine 410.

The embodiment shown in FIG. 4 illustrates the backplate protrusion 413 as a projection coming from the center of the connection end of the body 411. The backplate protrusion 413 in this embodiment is configured to fit snugly inside a depressed cavity on the connection end of the wireless battery power source 421. In other embodiments, the backplate may instead be at the base of a depressed cavity at the connection end of the body. This cavity may be configured to matingly engage with a central projection of the wireless battery power source. In other words, the physical mating limitations may be reversed.

FIG. 3 also shows that the wireless battery power source may preferably have a display screen 424 and controller 422. The controller 422 may be used to turn on and off the tattoo machine 410 and to control the speed/power. The display screen 424 may be used to display information relevant to the wireless battery power source 421 to the user, such as battery life, on/off status, and current power level.

FIG. 4 is an illustration of an exploded and cross-section view of one embodiment of a tattoo machine and one embodiment of a disconnected wireless power source. FIG. 4 shows the tattoo machine 410 and the wireless battery power source 421 separated or disconnected from each other. As shown in FIG. 4, the wireless battery power source 421 may comprise a display screen 424, controller 422, and rechargeable battery 502. The connection end of the wireless battery power source 421 may comprise lip 98, cavity 520, at the bottom of which may be magnetic material portion 505, which may be a steel ring, exposed or covered by a thin layer, positive power surface 62, and negative power surface 61. As shown, the cavity 520 may be configured to matingly accept backplate protrusion 413.

FIG. 4 shows that the tattoo machine 410 may comprise body 411, motor 57, motor housing 58, cam 510, positive spring pin connector 41, negative spring pin connector 53, backplate protrusion 413, grip 412, female grip threads 55, male body threads 54, magnet 415, O-ring groove 414, O-ring 42, and ledge 99. When the backplate protrusion 413 is inserted into cavity 520, the wireless battery power source 421 is operatively and electrically connected to the tattoo machine 410, such that power from the rechargeable battery 502 may flow to motor 57. The O-ring 42 is configured to frictionally engage with an inside wall of cavity 520. Magnet 415 is configured to magnetically and/or physically engage with magnetic material portion 505, such that a magnetic force, and friction from the O-ring 42, keep the wireless battery power source 421 operatively connected to the tattoo machine 410. The positive spring pin connector 41 is configured to operatively connect to positive power surface 62 and negative spring pin connector 53 is configured to operatively connect to negative power surface 61. When the wireless battery power source 421 is operatively and electrically connected to the tattoo machine 410, preferably lip 98 is flush with and in directly contact with ledge 99, which provides a streamlined silhouette to the connected device.

FIG. 4 also shows how the grip 412 may be threadably attached to the body 411. FIG. 4 also shows that the wireless battery powers source 421 may have a charging port 63, which may be coupled to a power cord that allows the rechargeable battery 502 to be recharged.

Figure 5:
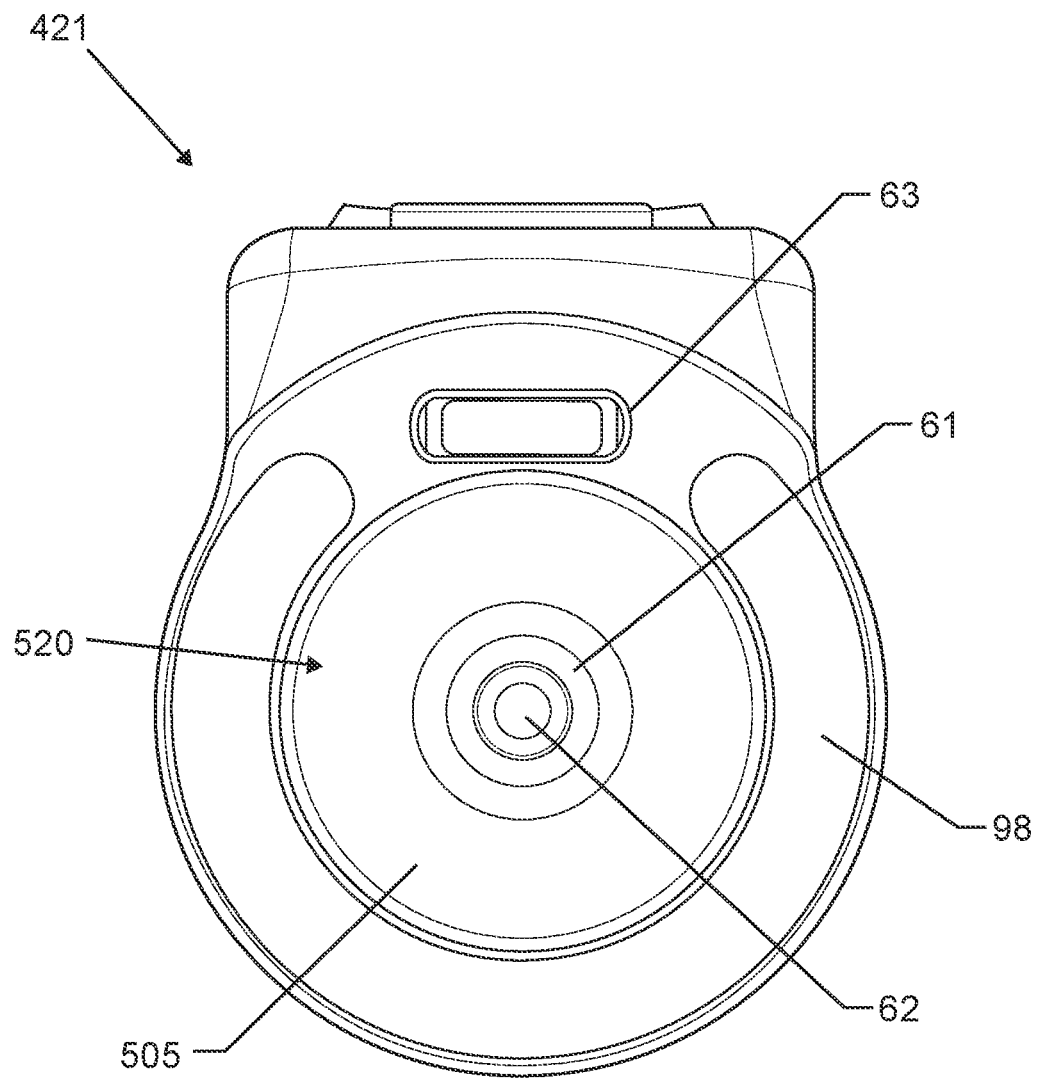
FIG. 5 is an illustration of a connection end view of one embodiment of the removeable and replaceable wireless battery power source.

FIG. 5 is an illustration of a connection end view of one embodiment of the removeable and replaceable wireless battery power source. As shown on FIG. 5, the connection end of the wireless battery powers source 421 may comprise lip 98, cavity 520, at the bottom of which may be magnetic material portion 505, which may be a steel ring, exposed or covered by a thin layer, positive power surface 62, and negative power surface 61. As shown, cavity 520 may be configured to matingly accept backplate protrusion 413. FIG. 5 also shows that the wireless battery powers source 421 may have a charging port 63, which may be coupled to a power cord that allows the rechargeable battery 502 to be recharged.

Figure 6:
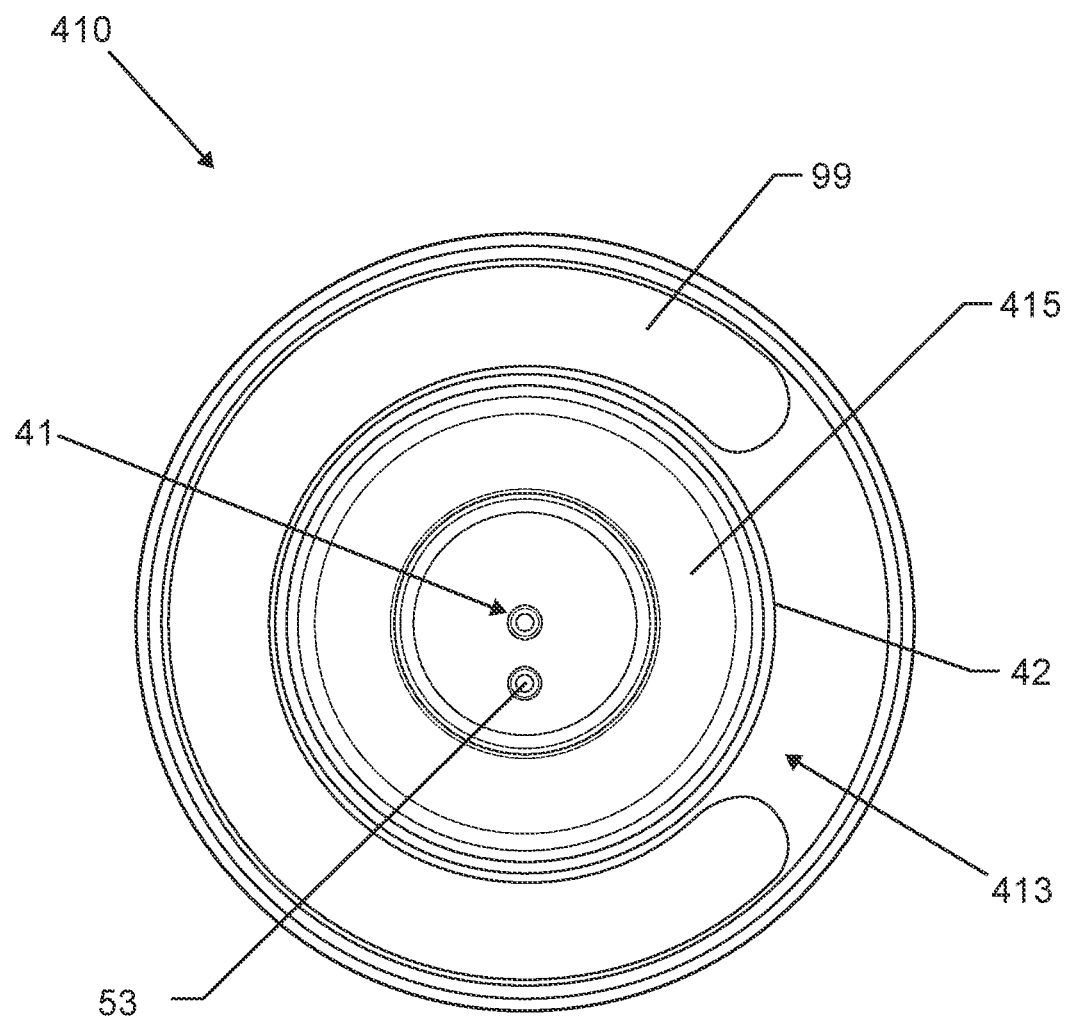
FIG. 6 is an illustration of a connection end view of one embodiment of an exposed back plate of one embodiment of a tattoo machine.

FIG. 6 is an illustration of a connection end view of one embodiment of an exposed back plate of one embodiment of a tattoo machine. As shown in FIG. 6, the connection end of the tattoo machine 410 may comprise positive spring pin connector 41, negative spring pin connector 53, backplate protrusion 413, magnet 415, O-ring 42, and ledge 99. As shown, magnet 415 may be an embedded ring-shaped magnet at the end of backplate protrusion 413. In other embodiments, there may be more than one magnet and the magnets may be any shape. The positive and negative spring pin connectors 41, 53 may be placed towards the center of the backplate protrusion 413. Intentional strength may be required to remove the magnetic material/steel segment of the wireless battery power source from the magnet 415 of the tattoo machine 410. Based on the overall configuration of the elements of the bottom of the power source and the top of the body, the bottom end of the power source and the backplate protrusion 413 of the body may be configured to fully rotate about each other.

Figure 7:
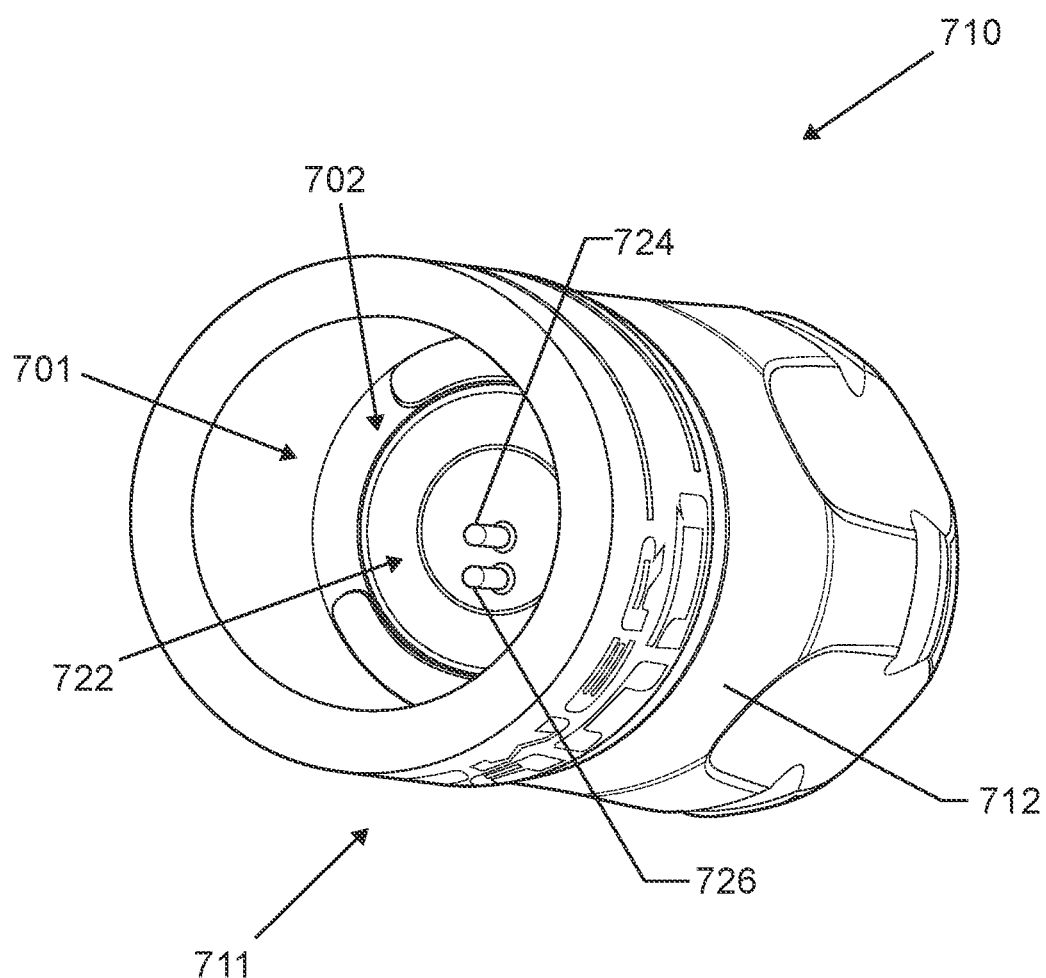
FIG. 7 is an illustration of one embodiment of a tattoo machine with an exposed backplate, which is not connected to a power source, wherein the exposed backplate is at the base of a depressed cavity.

FIG. 7 is an illustration of one embodiment of a tattoo machine with an expose backplate, which is not connected to a power source, wherein the exposed backplate is at the base of a depressed cavity. FIG. 7 is an illustration of an alternative embodiment of the tattoo machine 710, wherein the backplate 720 is not a protrusion, but instead is at the base of a depressed cavity 701, which is part of body 711. The body 711 may be connected to grip 712. As shown in FIG. 7, the backplate 720 may comprise magnet 722 positive spring pin connector 724 and negative spring pin connector 726. The depressed cavity 701 is configured to matingly engage with a protrusion or projection on the wireless battery power source shown in FIG. 8.

Figure 8:
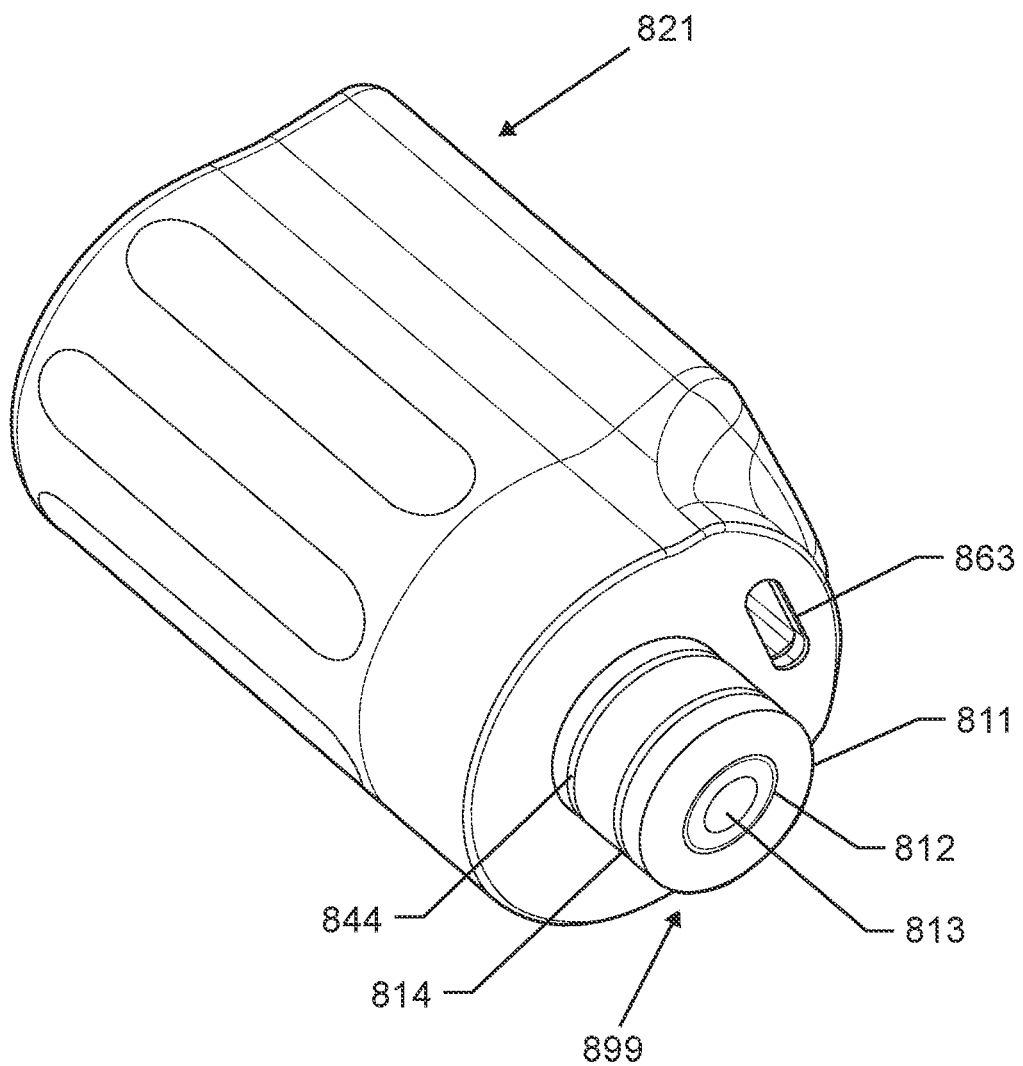
FIG. 8 is an illustration of one embodiment of the removeable and replaceable wireless battery power source, wherein the connection end of the wireless batter power source has a central projection that is configured to matingly engage with a depressed cavity of one embodiment of the tattoo machine.

FIG. 8 is an illustration of one embodiment of the removeable and replaceable wireless battery power source, wherein the connection end of the wireless batter power source has a central projection that is configured to matingly engage with a depressed cavity of one embodiment of the tattoo machine. FIG. 8 shows that wireless battery power source 821 may comprise a connection end that comprises a central projection 899, which is configured to matingly engage with depressed cavity 701 shown in FIG. 7. The central projection 899 may comprise a magnetic material portion 811, which may magnetically attract the embedded magnet of the tattoo machine shown in FIG. 7. The central projection 899 may further comprise a positive power connector interface surface 813 and negative power connector interface surface 812, which are configured to operatively and electrically engage with the spring pin connectors shown in FIG. 7. FIG. 8 also shows that the central projection 899 may have two O-rings 814, 844, which are configured to frictionally engage with the sides of the depressed cavity 701. Finally, the wireless battery power source 821 may have a charging port 863.

Unless otherwise stated, all measurements, values, ratings, positions, magnitudes, sizes, locations, and other specifications, which set forth in this specification, including in the claims that follow, are approximate, not exact. They are intended to have a reasonable range, which is consistent with the functions to which they relate and with what is customary in the art to which they pertain.

The foregoing description of the preferred embodiment has been presented for the purposes of illustration and description. While multiple embodiments are disclosed, still other embodiments will become apparent to those skilled in the art from the above detailed description, which shows and describes the illustrative embodiments. As will be realized, these embodiments are capable of modifications in various obvious aspects, all without departing from the spirit and scope of the present disclosure. Accordingly, the detailed description is to be regarded. As illustrative in nature and not restrictive. Also, although not explicitly recited, one or more additional embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Except as stated immediately above, nothing which has been stated or illustrated is intended or should be interpreted to cause a dedication of any component, step, feature, object, benefit, advantage, or equivalent to the public, regardless of whether it is or is not recited in the claims.

What is claimed is:

1. A tattoo machine and wireless battery power supply comprising:
 a tattoo machine; and
 a wireless battery power supply;
 wherein said tattoo machine comprises a body, a motor, and a power supply connection end;
 wherein said wireless battery power supply comprises a battery and a tattoo machine connection end;
 wherein said tattoo machine connection end and said power supply connection end are configured to matingly and electronically engage one another;
 wherein said tattoo machine connection end comprises a depressed cavity at the bottom of which is a power supply positive connector, a power supply negative connector, and a magnetic material portion;
 wherein said power supply connection end comprises a backplate protrusion;
 wherein said backplate protrusion comprises one or more O-ring grooves, one or more O-rings, a tattoo machine positive connector, a tattoo machine negative connector, and a magnet;
 wherein when said tattoo machine connection end and said power supply connection end are matingly and electronically engaged with on another:
  (i) said backplate protrusion is substantially within said depressed cavity;
  (ii) said one or more O-rings frictionally contact an interior surface of said depressed cavity;
  (iii) said magnet and said magnetic material portion are magnetically coupled;
  (iv) said power supply negative connector is engaged with said tattoo machine negative connector;
  (v) said power supply positive connector is engaged with said tattoo machine positive connector; and
  (vi) said tattoo machine connection end and said power supply connection end may be purposefully pulled apart by overcoming friction of said one or more O-rings and by overcoming magnetic coupling of said magnet and said magnetic material portion.

2. The tattoo machine and wireless battery power supply of claim 1, wherein said battery is rechargeable.

3. The tattoo machine and wireless battery power supply of claim 1, wherein said magnet is a correlated polymagnet.

4. The tattoo machine and wireless battery power supply of claim 1, wherein said backplate protrusion and said depressed cavity are both substantially cylindrical in shape.

5. The tattoo machine and wireless battery power supply of claim 1, wherein said tattoo machine positive connector is a positive power spring pin connector; and
 wherein said tattoo machine negative connector is a negative power spring pin connector.

6. The tattoo machine and wireless battery power supply of claim 1, wherein said power supply positive connector is a positive power connector interface surface; and
 wherein said power supply negative connector is a negative power connector interface surface.

7. The tattoo machine and wireless battery power supply of claim 1, wherein said tattoo machine further comprises a removable grip.

8. The tattoo machine and wireless battery power supply of claim 1, wherein there are two O-ring grooves and two O-rings.

9. A tattoo machine and wireless battery power supply comprising:
 a tattoo machine; and
 a wireless battery power supply;
 wherein said tattoo machine comprises a body, a motor, and a power supply connection end;
 wherein said wireless battery power supply comprises a battery and a tattoo machine connection end;
 wherein said tattoo machine connection end and said power supply connection end are configured to matingly and electronically engage one another;
 wherein said tattoo machine connection end comprises a protrusion at the top of which is a power supply positive connector, a power supply negative connector, and a magnetic material portion;
 wherein said protrusion further comprises one or more O-ring grooves and one or more O-rings;
 wherein said power supply connection end comprises a backplate depressed cavity;
 wherein said backplate depressed cavity comprises a tattoo machine positive connector, a tattoo machine negative connector, and a magnet;
 wherein when said tattoo machine connection end and said power supply connection end are matingly and electronically engaged with on another:
  (i) said protrusion is substantially within said backplate depressed cavity;
  (ii) said one or more O-rings frictionally contact an interior surface of said backplate depressed cavity;
  (iii) said magnet and said magnetic material portion are magnetically coupled;
  (iv) said power supply negative connector is engaged with said tattoo machine negative connector;
  (v) said power supply positive connector is engaged with said tattoo machine positive connector; and
  (vi) said tattoo machine connection end and said power supply connection end may be purposefully pulled apart by overcoming friction of said one or more O-rings and by overcoming magnetic coupling of said magnet and said magnetic material portion.

10. The tattoo machine and wireless battery power supply of claim 9, wherein said battery is rechargeable.

11. The tattoo machine and wireless battery power supply of claim 9, wherein said magnet is a correlated polymagnet.

12. The tattoo machine and wireless battery power supply of claim 9, wherein said protrusion and said backplate depressed cavity are both substantially cylindrical in shape.

13. The tattoo machine and wireless battery power supply of claim 9, wherein said tattoo machine positive connector is a positive power spring pin connector; and wherein said tattoo machine negative connector is a negative power spring pin connector.

14. The tattoo machine and wireless battery power supply of claim 9, wherein said power supply positive connector is a positive power connector interface surface; and wherein said power supply negative connector is a negative power connector interface surface.

15. The tattoo machine and wireless battery power supply of claim 9, wherein said tattoo machine further comprises a removable grip.

16. The tattoo machine and wireless battery power supply of claim 9, wherein there are two O-ring grooves and two O-rings.

17. A tattoo machine and wireless battery power supply comprising:

a tattoo machine; and a wireless battery power supply;

wherein said tattoo machine comprises a body, a motor, a removeable grip, and a power supply connection end;

wherein said wireless battery power supply comprises a rechargeable battery and a tattoo machine connection end;

wherein said tattoo machine connection end and said power supply connection end are configured to matingly and electronically engage one another;

wherein said tattoo machine connection end comprises a depressed cavity at the bottom of which is a power supply positive connector, a power supply negative connector, and a magnetic material portion;

wherein said power supply connection end comprises a backplate protrusion;

wherein said backplate protrusion comprises one or more O-ring grooves, one or more O-rings, a tattoo machine positive connector, a tattoo machine negative connector, and a correlated polymagnet;

wherein said backplate protrusion and said depressed cavity are both substantially cylindrical in shape;

wherein when said tattoo machine connection end and said power supply connection end are matingly and electronically engaged with on another:

(i) said backplate protrusion is substantially within said depressed cavity;

(ii) said one or more O-rings frictionally contact an interior surface of said depressed cavity;

(iii) said correlated polymagnet and said magnetic material portion are magnetically coupled;

(iv) said power supply negative connector is engaged with said tattoo machine negative connector;

(v) said power supply positive connector is engaged with said tattoo machine positive connector; and (vi) said tattoo machine connection end and said power supply connection end may be purposefully pulled apart by overcoming friction of said one or more O-rings and by overcoming magnetic coupling of said magnet and said magnetic material portion.

18. The tattoo machine and wireless battery power supply of claim 17, wherein said tattoo machine positive connector is a positive power spring pin connector; and wherein said tattoo machine negative connector is a negative power spring pin connector.

19. The tattoo machine and wireless battery power supply of claim 17, wherein said power supply positive connector is a positive power connector interface surface; and wherein said power supply negative connector is a negative power connector interface surface.

20. The tattoo machine and wireless battery power supply of claim 17, wherein there are two O-ring grooves and two O-rings.

* * * * *